(12) United States Patent
Tamura et al.

(10) Patent No.: US 7,232,471 B2
(45) Date of Patent: Jun. 19, 2007

(54) HYDROGEN GENERATOR AND FUEL CELL SYSTEM COMPRISING THE SAME

(75) Inventors: Yoshio Tamura, Kashihara (JP); Yuji Mukai, Kadoma (JP); Akira Maenishi, Ikeda (JP); Tomonori Asou, Kitakatsuragi-gun (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 623 days.

(21) Appl. No.: 10/681,337

(22) Filed: Oct. 9, 2003

(65) Prior Publication Data

US 2004/0115494 A1 Jun. 17, 2004

(30) Foreign Application Priority Data

Oct. 10, 2002 (JP) ............................. 2002-297204
Jul. 4, 2003 (JP) ............................. 2003-270971

(51) Int. Cl.
*B01J 7/00* (2006.01)

(52) U.S. Cl. ..................... 48/61; 48/127.9; 48/197 R; 422/173; 422/198; 431/268; 429/17; 122/32; 122/33; 165/166; 165/167

(58) Field of Classification Search ............ 48/61, 48/127.9, 197 R; 422/173, 198; 431/268; 429/17; 122/32, 33; 165/166, 167
See application file for complete search history.

(56) References Cited

U.S. PATENT DOCUMENTS 6,106,963 A * 8/2000 Nitta et al. ............ 429/19

6,294,276 B1 * 9/2001 Ogino ........................ 429/17
2002/0042035 A1 * 4/2002 Komiya et al. ............ 431/268

FOREIGN PATENT DOCUMENTS

| EP | 1197261 A2 | 4/2002 |
|---|---|---|
| JP | 2001064658 | 3/2001 |
| JP | 2002187705 | 7/2002 |

* cited by examiner

Primary Examiner—Glenn Caldarola
Assistant Examiner—Vinit H. Patel
(74) Attorney, Agent, or Firm—Stevens, Davis, Miller & Mosher, LLP

(57) ABSTRACT

A hydrogen generator comprises a burner for generating a combustion gas, a reformer provided around the burner to generate a reformed gas containing hydrogen by a steam reforming reaction based on a feed material comprising a compound containing at least carbon and hydrogen and a steam, using heat transmission from a combustion gas generated by the burner, and an evaporator having an inner tube provided around the burner, an outer tube provided around the inner tube, and a bottom plate that closes a lower portion of a tubular space formed between the inner tube and the outer tube, the evaporator being configured to evaporate water supplied to the tubular space to generate a steam to be supplied to the reformer, wherein a water absorbing member having a water absorbing capability is provided in the tubular space.

18 Claims, 13 Drawing Sheets

HYDROGEN GENERATOR AND FUEL CELL SYSTEM COMPRISING THE SAME

BACKGROUND OF THE INVENTION

1. Field of the Invention

The present invention relates both to a hydrogen generator configured to generate a reformed gas by reacting a compound containing carbon and hydrogen with water and supply the reformed gas to a fuel cell configured to generate a power using hydrogen, and to a fuel cell system comprising the hydrogen generator.

2. Description of the Related Art

In general, a steam reforming reaction is employed as a method of generating hydrogen to be supplied to a fuel cell. The steam reforming reaction is to react a city gas and a steam as a feed material using a ruthenium catalyst at a high temperature of approximately 600° C. to 800° C. to generate a reformed gas containing hydrogen as a major component.

FIG. 12 is a cross-sectional view schematically showing a configuration of the conventional hydrogen generator disclosed in Japanese Laid-Open Patent Application Publication No. 2002-187705. The hydrogen generator in FIG. 12 is multiple-concentric cylindrical. As shown in FIG. 12, the hydrogen generator is comprised of a plurality of tubes provided concentrically with one another, a burner 73 provided at a center within an innermost tube 93 to heat a feed material to generate a combustion gas 74 as a heat source for causing the steam reforming reaction to occur, a reforming catalyst layer 88 provided within a space formed by the tubes, a shift catalyst layer 87, a selective oxidization catalyst layer 86, and the like.

In the conventional hydrogen generator, first of all, water 72 for a reforming process (reforming water 72) is supplied to a heater 75 and heated by the combustion gas 74 flowing under the heater 75. As a result, the reforming water 72 is partially evaporated. And, the reforming water 72 partially evaporated moves downwardly through a connecting tube 76 and is delivered to a supply passage 77 of a city gas 71.

The combustion gas 74 flowing under the heater 75 is discharged to outside of the hydrogen generator as an exhaust gas 92 having low calories. At a portion where the connecting tube 76 and the supply passage 77 are connected to each other, the reforming water 72 in a partially evaporated state that has passed through the connecting tube 76 is mixed with the city gas 71 that has passed through the supply passage 77. The resulting mixture of the city gas 71 and the reforming water 72 is supplied to an evaporator 78.

The evaporator 78 is comprised of an outer tube 79, an inner tube 80, an intermediate tube 81 disposed between the inner tube 80 and the outer tube 79, and a bottom plate 82. Between the intermediate tube 81 and the outer tube 79, there are provided round bars 83 spirally wound. The round bars 83 form a spiral downward flow passage 84. In addition, between the inner tube 80 and the intermediate tube 81, an upward flow passage 85 is formed.

The downward flow passage 84 is heated up to a temperature between 100° C. and 150° C. by a generated gas flowing within the selective oxidization catalyst layer 86 provided outside of and in contact with the downward flow passage 84. Meanwhile, the upward flow passage 85 is heated up to a temperature between 250° C. and 350° C. by a generated gas flowing within a shift catalyst layer 87 provided inside of and in contact with the upward flow passage 85. Most of the reforming water 72, of the mixture of the reforming water 72 in the partially evaporated state and the city gas 71, is evaporated while flowing downwardly within the downward flow passage 84, and the reforming water 72 remaining unevaporated is completely evaporated while flowing upwardly within the upward flow passage 85. And, the feed gas containing the mixture of the steam and the city gas 71 is heated up to a temperature between 200° C. and 300° C. within the upward flow passage 85 and supplied to the reforming catalyst layer 88.

While flowing within the reforming catalyst layer 88, the feed gas is heated up to a temperature between 600° C. and 800° C. by a high-temperature combustion gas 74 flowing as a counter flow in a space within the tube on the inner side, thereby causing the steam reforming reaction to occur. As a result, the feed gas is converted into the generated gas containing hydrogen, carbon monoxide, carbon dioxide, and steam.

While flowing upwardly within a return flow passage 89, the generated gas is cooled to be approximately 350° C. by heat exchange with the feed gas flowing downwardly within the reforming catalyst layer 88 and then flows into the shift catalyst layer 87. Within the shift catalyst layer 87, shift reaction is conducted in such a manner that carbon monoxide contained in the generated gas reacts with the steam to be converted into carbon dioxide and hydrogen, thereby resulting in reduced concentration of carbon monoxide contained in the generated gas. This reaction is an exothermic reaction. The resulting reaction heat and sensible heat owned by the generated gas are used to evaporate the reforming water 72 moving upwardly within the upward flow passage 85 and to heat the generated steam and the city gas 71. At an exit of the shift catalyst layer 87, the generated gas is cooled to approximately 150° C. The generated gas is mixed with an air 90 for oxidation of carbon monoxide which is supplied from outside of the hydrogen generator. Thereafter, selective oxidation reaction is conducted using carbon monoxide remaining within the selective oxidation catalyst layer 86, oxygen contained in the air which is supplied externally, and the generated gas. As a result, a generated gas 91 containing a carbon monoxide at a concentration of 10 ppm or lower is delivered to the fuel cell.

The above-mentioned selective oxidation reaction is also the exothermic reaction. The reaction heat and the sensible heat owned by the generated gas are used to evaporate the reforming water 72 flowing downwardly within the downward flow passage 84 of the evaporator 78. At an exit of the selective oxidation catalyst layer 86, the temperature of the generated gas 91 is cooled to approximately 100° C.

Thus, within the evaporator 78, the reforming water 72 is evaporated by heating up to the temperature between 250° C. and 350° C. from the side of the inner tube 80 and by heating up to the temperature between 100° C. and 150° C. from the side of the outer tube 79, and the resulting steam is mixed with the city gas 71. And, the mixture of the steam and the city gas 71 are heated up to the temperature between 200° C. and 300° C.

The round bars 83 wound in a spiral shape within the downward flow passage 84 allows the reforming water 72 supplied to the downward flow passage 84 to move along the periphery of the inner face of the outer tube 79. Thus, in this configuration, a sufficient heat transmission area is ensured.

The reforming catalyst layer 88, the shift catalyst layer 87, the selective oxidation catalyst layer 86, and the evaporator 78 are integrated. This makes the hydrogen generator small-sized. In addition, since in the hydrogen generator, from a high-temperature portion to a low-temperature portion is arranged from a center portion to a peripheral portion thereof, loss of heat emission is thereby reduced. As a result, heat efficiency of the hydrogen generator is improved.

Meanwhile, as shown in FIG. 13, there has been proposed an evaporator comprising a water absorbing member having a capillary force, as a technology intended to improve a capability of the evaporator included in the hydrogen generator for the fuel cell (see Japanese Laid-Open Patent Application Publication No. 2001-64658). This evaporator is of a plate type and is comprised of single evaporators layered in multiple stages. The evaporator is configured to evaporate a liquid fuel such as methanol and supply the evaporated fuel to a reformer.

FIG. 13 is a schematic cross-sectional view showing a configuration of the evaporator included in the conventional hydrogen generator disclosed in Japanese Laid-Open Patent Application Publication No. 2001-64658. As shown in FIG. 13, this evaporator has a cylindrical evaporation chamber 115 within which liquid is evaporated. A cylindrical heating chamber 116 is provided on an outer peripheral side of the evaporation chamber 115 to be coaxially with the evaporation chamber 115. The evaporation chamber 115 and the heating chamber 116 are separated from each other by a separating wall 118.

A water absorbing member 119 is provided on a face of the separating wall 118 on the side of the evaporation chamber 115. The water absorbing members 119 is made of fabrics and porous-sintered material and has a capillary force. A liquid collecting member 111 is provided on an upper portion of the evaporation chamber 115, and a liquid distribution member 120 is provided on a lower portion thereof to supply a liquid fuel 113 supplied externally through a supply passage 114 to the water absorbing member 119.

The upper portion of the evaporation chamber 115 opens upwardly and a steam 10 generated within the evaporation chamber 115 is discharged from the upper portion to outside.

In the conventional evaporator configured as described above, the liquid fuel 113 that has passed through the supply passage 114 is supplied to the water absorbing member 119 through the liquid distribution member 120. As a result, the liquid fuel 113 spreads over the entire water absorbing member 119 by the capillary force of the water absorbing member 119. This increases an evaporation area of the liquid fuel 113, and therefore, the evaporation chamber 115 that has a relatively small volume is sufficient. Therefore, in the above configuration, the entire evaporator can be small-sized.

As described above, the conventional hydrogen generator in FIG. 12 is provided with the round bars 83 to form the spiral flow passage for sufficient heat transmission area of the downward flow passage 84. If there is a gap between the round bars 83 and the outer tube 79, and between the round bars 83 and the inner tube 81, then the reforming water 72 flows through the gap, and therefore, sufficient heat transmission area cannot be obtained. It is therefore necessary to arrange the round bars 83 without the gap between the round bars 83 and the outer tube 79, and between the round bars 83 and the inner tube 81. In some cases, it is necessary to fix the round bars 83 to a face of one of the tubes by welding or brazing without the gap and to press the other tube against the round bars 83. This makes manufacturing steps complex. In addition, manufacturing precision of parts requires strictness. Consequently, manufacturing cost becomes high.

In the case where the hydrogen generator is operated in a steady state, the evaporator 78 is heated to a temperature in the above-mentioned range from both of the inner and outer sides. During start, the hydrogen generator has an ambient temperature. So, in order to increase the temperature of the hydrogen generator, before the city gas 72 is supplied, the burner 73 is ignited to generate the combustion gas 74. The reforming water 72 is less likely to be evaporated because of its high evaporation latent heat. In addition, if the steam within the hydrogen generator is insufficient when the city gas 71 is supplied, then the city gas 71 is thermally decomposed to cause carbon to be deposited within the reforming catalyst layer 88, and to cause the catalyst to be thereby degraded. Therefore, it is necessary to supply the reforming water 72 before the city gas 71 to fill the steam within the hydrogen generator. Accordingly, in a short time after ignition of the burner 73, the reforming water 72 starts to be supplied. However, in the configuration in FIG. 12, since the evaporator 78 is not directly heated by the combustion gas 74, and is indirectly heated by conduction of heat from the center portion of the hydrogen generator and by the reforming water 72 heated by the heater 75, the evaporator 78 is incapable of generating the steam for some time after start. This follows that the reforming water 72 continues to remain within the evaporator 78. Long time is required to evaporate the reforming water 72 remaining within the evaporator 78. As should be appreciated from this, in the conventional hydrogen generator, start time becomes long.

On the other hand, since in the configuration in FIG. 13, the evaporator needs to be independently of the hydrogen generator, loss of heat emission occurs in a steam piping from the evaporator to the hydrogen generator and a piping through which a high-temperature fluid flows to the evaporator. For this reason, heat efficiency of the hydrogen generator is reduced.

SUMMARY OF THE INVENTION

The present invention has been made under the circumstances, and an object of the present invention is to provide a hydrogen generator having a simple configuration, high evaporation capability, and high heat efficiency.

According to the present invention, there is provided a hydrogen generator comprising a burner for generating a combustion gas; a reformer provided around the burner to generate a reformed gas containing hydrogen by a steam reforming reaction from a feed material comprising a compound containing at least carbon and hydrogen and a steam, using heat transmission from a combustion gas generated by the burner; and an evaporator having an inner tube provided around the burner, an outer tube provided around the inner tube, and a bottom plate that closes a lower portion of a tubular space formed between the inner tube and the outer tube, the evaporator being configured to evaporate water supplied to the tubular space to generate the steam to be supplied to the reformer, wherein a water absorbing member having a water absorbing capability is provided in the tubular space.

In such a configuration, the water absorbing member provided in the tubular space can improve an evaporation capability. Therefore, the water reserved in the evaporator during start of the hydrogen generator is quickly evaporated. Consequently, the start time of the hydrogen generator can be reduced.

In addition, since the steam can be supplied to the reformer stably, load fluctuation or the like can be easily dealt with.

It is preferable that, in the hydrogen generator, a first evaporation chamber having a downward flow passage through which the water supplied from above flows downwardly, and a second evaporation chamber provided on an inner side of the first evaporation chamber and having an upward flow passage through which the steam generated by evaporation of the water within the first evaporation chamber flows upwardly are provided in the tubular space, and the water absorbing member is provided within the first evaporation chamber.

It is preferable that, in the hydrogen generator, the evaporator further has an intermediate tube disposed between the inner tube and the outer tube, the first evaporation chamber is provided in a tubular space formed between the outer tube and the intermediate tube, and the second evaporation chamber is provided in a tubular space formed between the inner tube and the intermediate tube, and the water absorbing member is provided on a face of the outer tube on the first evaporation chamber side.

It is preferable that, in the hydrogen generator, a first evaporation chamber having a downward flow passage through which the water supplied from above flows downwardly, and a second evaporation chamber provided on an inner side of the first evaporation chamber and having an upward flow passage through which the steam generated by evaporation of the water within the first evaporation chamber flows upwardly are provided in the tubular space, and the water absorbing member is provided within the second evaporation chamber.

It is preferable that, in the hydrogen generator, the evaporator further has an intermediate tube disposed between the inner tube and the outer tube, the first evaporation chamber is provided in a tubular space formed between the outer tube and the intermediate tube, and the second evaporation chamber is provided in a tubular space formed between the inner tube and the intermediate tube, and the water absorbing member is provided on a face of the inner tube on the second evaporation chamber side.

It is preferable that, in the hydrogen generator, a first evaporation chamber having a downward flow passage through which the water supplied from above flows downwardly, and a second evaporation chamber provided on an inner side of the first evaporation chamber and having an upward flow passage through which the steam generated by evaporation of the water within the first evaporation chamber flows upwardly are provided in the tubular space, and the water absorbing member is provided within the first evaporation chamber and the second evaporation chamber.

It is preferable that in the hydrogen generator, the evaporator has an intermediate tube disposed between the inner tube and the outer tube, the first evaporation chamber is provided in a tubular space formed between the outer tube and the intermediate tube, and the second evaporation chamber is provided in a tubular space formed between the inner tube and the intermediate tube, and the water absorbing member is provided on a face of the outer tube on the first evaporation chamber side and a face of the inner tube on the second evaporation chamber side.

It is preferable that in the hydrogen generator, the water absorbing member is provided on an upper face of the bottom plate.

It is preferable that in the hydrogen generator, the water absorbing member is made of one of a porous material, a mesh-shaped material, and a fabric-shaped material.

It is preferable that in the hydrogen generator, the water absorbing member provided on a face of the outer tube on the first evaporation chamber side is arranged in a spiral shape.

It is preferable that in the water absorbing member provided on a face of the inner tube on the second evaporation chamber side is made of a material having a plurality of holes, and a space having an average hole diameter of the water absorbing member or more is provided between the face of the inner tube on the second evaporation chamber side and the water absorbing member.

It is preferable that in the hydrogen generator, heat conductivity of the water absorbing member provided on a face of the inner tube on the second evaporation chamber side is equal to or higher than heat conductivity of the inner tube.

It is preferable that in the hydrogen generator, the water absorbing member is formed by performing non-leveling process on the face of the outer tube on the first evaporation chamber side.

It is preferable that in the hydrogen generator, the water absorbing member is formed by performing non-leveling process on the face of the inner tube on the second evaporation chamber side.

It is preferable that in the hydrogen generator, the water absorbing member is formed by performing non-leveling process on the face of the outer tube on the first evaporation chamber side and on the face of the inner tube on the second evaporation chamber side.

It is preferable that in the hydrogen generator, a spacing between concave and convex portions formed by the non-leveling process is not less than 0.05 mm and not more than 1 mm.

It is preferable that in the hydrogen generator, the non-leveling process is performed by one of etching process, laser processing, and blasting process.

According to the present invention, there is provided a fuel cell system comprising a hydrogen generator including a burner for generating a combustion gas; a reformer provided around the burner to generate a reformed gas containing hydrogen by a steam reforming reaction based on a feed material comprising a compound containing at least carbon and hydrogen and a steam, using heat transmission from a combustion gas generated by the burner; and an evaporator having an inner tube provided around the burner, an outer tube provided around the inner tube, and a bottom plate that closes a lower portion of a tubular space formed between the inner tube and the outer tube, the evaporator being configured to evaporate water supplied to the tubular space to generate the steam to be supplied to the reformer, wherein a water absorbing member having a water absorbing capability is provided in the tubular space, and a fuel cell configured to generate a power using an oxidization gas containing oxygen and the reformed gas supplied from the hydrogen generator.

In accordance with the hydrogen generator of the present invention, the evaporation capability can be improved and loss of heat emission can be reduced, using a simple configuration.

The above and further objects and features of the invention will be more fully be apparent from the following detailed description with accompanying drawings.

DETAILED DESCRIPTION OF THE PREFERRED EMBODIMENTS

Hereinafter, an embodiment of the present invention will be described with reference to the accompanying drawings.

Figure 1:
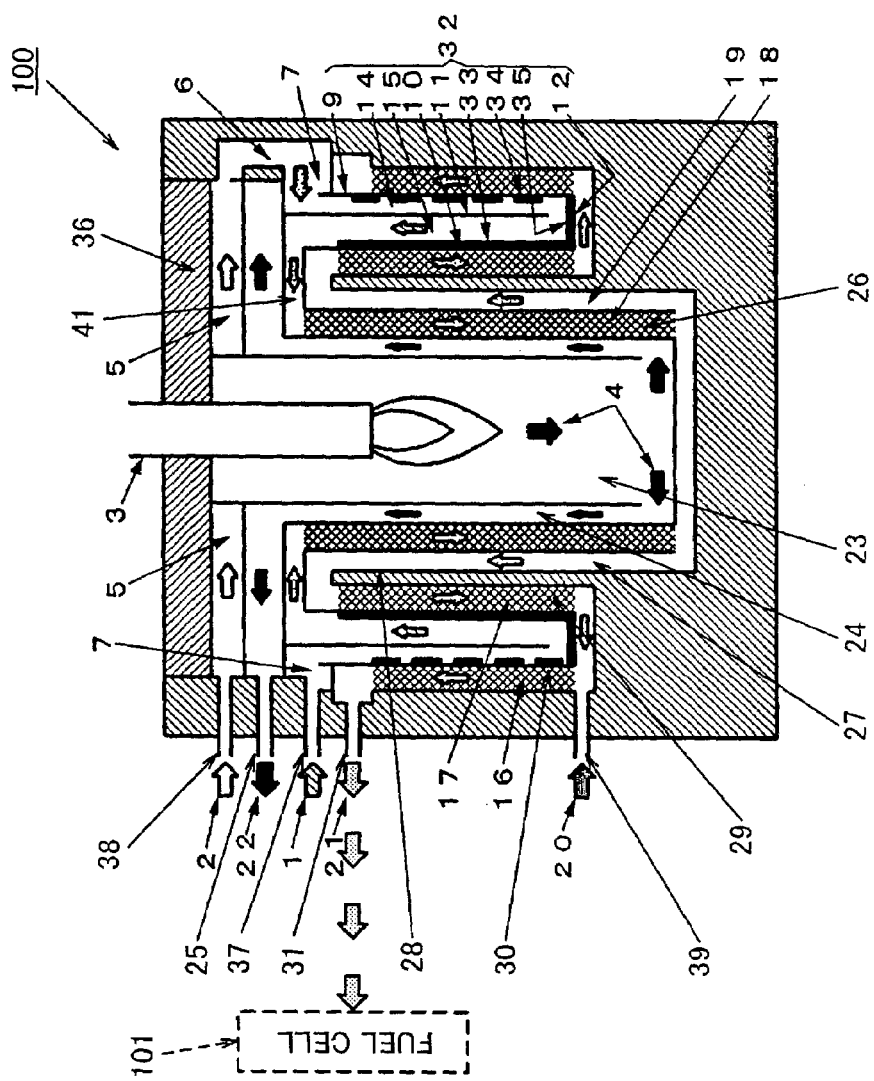
FIG. 1 is a cross-sectional view schematically showing a configuration of the hydrogen generator of the present invention.

FIG. 1 is a cross-sectional view schematically showing a configuration of a hydrogen generator of the present invention. As shown in FIG. 1, a hydrogen generator 100 comprises a burner 3 configured to generate a combustion gas 4 and a cylindrical combustion chamber 23 provided below the burner 3. On an outer peripheral side of the combustion chamber 23, a tubular combustion gas flow passage 24 is provided coaxially with the combustion chamber 23 to allow the combustion gas 4 generated by the burner 3 to flow from downward to upward. The combustion gas flow passage 24 is connected to an exhaust gas outlet 25 formed on an upper portion of a side face of the hydrogen generator 100. The combustion gas 4 flowing through the combustion gas flow passage 24 is discharged from the exhaust gas outlet 25 as an exhaust gas 22.

In addition to the exhaust gas outlet 25, on the upper portion of the side face of the hydrogen generator 100 of the present invention, there are provided a water supply port 38 configured to supply reforming water 2 to the hydrogen generator 100, a feed gas supply port 37 configured to supply a city gas 1 to the hydrogen generator 100, and a generated gas discharge port 31 configured to discharge a generated gas 21 to be supplied to a fuel cell 101 to outside of the hydrogen generator 100. Further, an air supply port 39 is provided on a lower portion of a side face of the hydrogen generator 100 to supply air 20 for oxidation of carbon monoxide to the hydrogen generator 100.

The burner 3 is mounted within the combustion chamber 23 through a mounting plate 36. Between the mounting plate 36 and the combustion gas flow passage 24, a heater 5 is provided to serve as a flow passage for heating the reforming water 2 supplied from the water supply port 38.

A supply passage 7 of the city gas 1 is connected to the feed gas supply port 37. The heater 5 is connected to the supply passage 7 through a connecting tube 6 provided as opposed to the water supply port 38. At a portion where the connecting tube 6 and the supply passage 7 are connected to each other, the reforming water 2 which has been partially evaporated by heating of the heater 5 is mixed with the city gas 1. The resulting mixture of the reforming water 2 and the city gas 1 is supplied to an evaporator 32 described later.

A tubular reformer 26 is provided coaxially with the combustion chamber 23 on an outer peripheral side of the combustion gas flow passage 24. The reformer 26 contains a reforming catalyst layer 18 filled with reforming catalyst. Within the reforming catalyst layer 18, the city gas 1 is subjected to a steam reforming reaction to be generated into a reformed gas.

A tubular reformed gas flow passage 27 is provided on an outer peripheral side of the reformer 26 to allow the reformed gas generated in the reformer 26 to flow therethrough. A tubular carbon monoxide (CO) shifter 29 is provided on an outer peripheral side of the reformed gas flow passage 27 with a heat insulating material 28 disposed between the reformed gas flow passage 27 and the shifter 29. The tubular reformed gas flow passage 27 and the tubular carbon monoxide shifter 29 are provided coaxially with the combustion chamber 23. The CO shifter 29 contains a shift catalyst layer 17 filled with a shift catalyst. Within the shift catalyst layer 17, the reformed gas flowing from the reformed gas flow passage 27 is subjected to shift reaction to cause a CO concentration of the reformed gas to be reduced.

A tubular evaporator 32 is provided on an outer peripheral side of the CO shifter 29 to be coaxially with the combustion chamber 23. As described above, the mixture of the reforming water 2 and the city gas 1 which has been obtained at the portion where the connetcing tube 6 and the supply passage 7 are connected to each other is supplied to the evaporator 32.

A tubular CO removing unit 30 is provided on an outer peripheral side of the evaporator 32 to be coaxially with the combustion chamber 23. The CO removing unit 30 is connected to an air supply port 39. The CO removing unit 30 contains a selective oxidation catalyst layer 16 filled with selective oxidation catalyst. Within the selective oxidation catalyst layer 16, the reformed gas discharged from the CO shifter 29 is reacted with the air 20 for oxidation of carbon monoxide which is supplied from the air supply port 39, thereby causing the CO concentration of the reformed gas to be reduced.

The CO removing unit 30 is connected to a generated gas discharge port 31. The reformed gas that was generated in the reformer 26 and passed within the CO shifter 29 and the CO removing unit 30 is discharged through the generated gas discharge port 31 as a generated gas 21.

A fuel cell 101 is provided outside of the hydrogen generator 100. The generated gas 21 discharged from the generated gas discharge port 31 is supplied to the fuel cell 101. The fuel cell 101 is configured to generate a power by a known method using the generated gas 21 supplied from the hydrogen generator 100 and the air as an oxidation gas. The hydrogen generator 100 and the fuel cell 101 configures a fuel cell system of the present invention.

Figure 2:
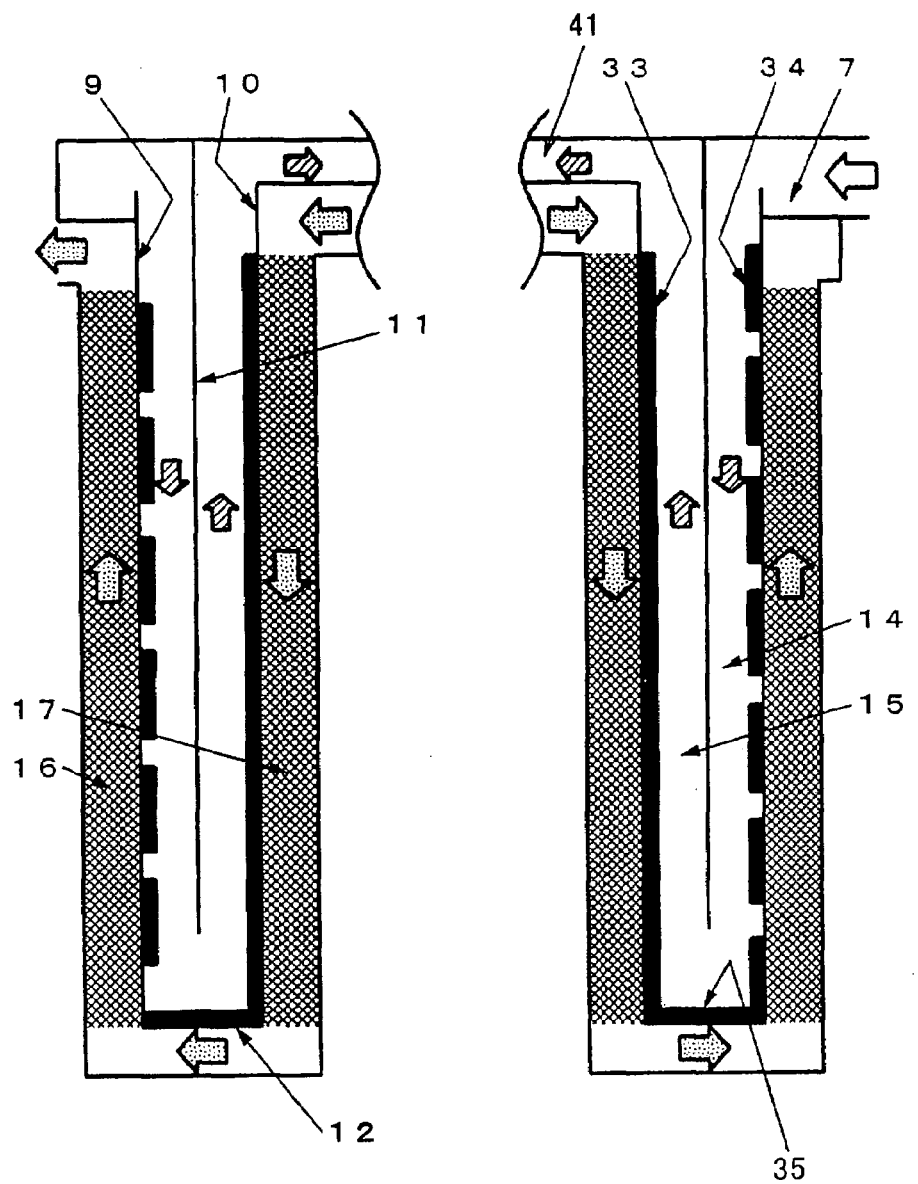
FIG. 2 is a cross-sectional view schematically showing a configuration of an evaporator included in the hydrogen generator of the present invention.

FIG. 2 is a cross-sectional view schematically showing a configuration of the evaporator 32 included in the hydrogen generator 100. As shown in FIG. 2, the evaporator 32 comprises an outer tube 9, an inner tube 10, an intermediate tube 11 disposed between the outer tube 9 and the inner tube 10, and a bottom plate 12 adapted to close a lower portion of a tubular space formed between the outer tube 9 and the inner tube 10 by connecting a lower end of the outer tube 9 to a lower end of the inner tube 10. The intermediate tube 11 does not extend to the bottom plate 12. Between the lower end of the intermediate tube 11 and the bottom plate 12, a gap with a predetermined width is formed over the entire periphery.

Within the tubular space formed between the outer tube 9 and the intermediate tube 11, a first evaporation chamber 14 is provided. Likewise, within a tubular space formed between the inner tube 10 and the intermediate tube 11, a second evaporation chamber 15 is provided. The first evaporation chamber 14 and the second evaporation chamber 15 communicate with each other through the gap between the intermediate tube 11 and the bottom plate 12.

An inner tube face water absorbing member 33 is provided on an outer face of the inner tube 10 (face on the side of the second evaporation chamber 15) and an outer tube face water absorbing member 34 is provided on an inner face of the outer tube 9 (face on the side of the first evaporation chamber 14). A bottom plate face water absorbing member 35 is provided on an upper face of the bottom plate 12. The inner tube face water absorbing member 33, the outer tube face water absorbing member 34, and the bottom plate face water absorbing member 35 are made of stainless steel porous metal provided with penetrating holes with an average hole diameter of 0.2 mm and having a thickness of 0.5 mm. These members 33, 34, and 35 are fixed to the corresponding tubular faces or plate faces by spot welding. The inner tube face water absorbing member 33 is provided substantially over the entire outer face of the inner tube 10. A lower end of the inner tube face water absorbing member 33 is located in contact with the bottom plate face water absorbing member 35. The outer tube face water absorbing member 34 made of tape-shaped porous metal is wound in a spiral shape along an inner face of the outer tube 9. Further, the bottom plate face water absorbing member 35 is provided to cover substantially the entire face of an upper face of the bottom plate 12.

The upper portion of the first evaporation chamber 14 is connected to the supply passage 7. The mixture of the reforming water 2 and the city gas 1 which is supplied through the supply passage 7 flows downwardly within the first evaporation chamber 14. That is, the first evaporation chamber 14 is provided with a downward flow passage of the mixture.

While flowing downwardly within the first evaporation chamber 14, the mixture of the reforming water 2 and the city gas 1 is heated up to a temperature between 100° C. and 150° C. by the generated gas flowing within the selective oxidation catalyst layer 16 contained within the CO removing unit 30 in contact with the outer tube 9. Thereby, the reforming water 2 flowing downwardly within the first evaporation chamber 14 is evaporated. As a result, the mixture of the steam and the city gas 1 flows upwardly within the second evaporation chamber 15. That is, the second evaporation chamber 15 is provided with an upward flow passage of the mixture. While flowing upwardly within the second evaporation chamber 15, the mixture of the steam and the city gas 1 is heated up to a temperature between 250° C. and 350° C. by the generated gas flowing within the shift catalyst layer 17 contained in the CO shifter 29 in contact with the inner tube 10.

The upper portion of the second evaporation chamber 15 is connected to a connetcing tube 41 configured to connect the second evaporation chamber 15 to the reformer 26. The mixture of the reforming water 2 and the city gas 1 that has passed through the first evaporation chamber 14 and the second evaporation chamber 15 is supplied to the reformer 26 through the connetcing tube 41.

In a home fuel cell system configured to generate a power of about 1 kW, the amount of the city gas supplied to the hydrogen generator in the fuel cell system is about 4 L/min, and the amount of the reforming water supplied to the hydrogen generator is about 10 g/min. Therefore, also in the present invention, here it is assumed that the amount of the city gas 1 supplied to the hydrogen generator 100 is about 4 L/min, and the amount of the reforming water 2 supplied to the hydrogen generator 100 is about 10 g/min.

Subsequently, functions of the inner tube face water absorbing member 33, the bottom plate face water absorbing member 35, and the outer tube face water absorbing member 34, will be described.

[Inner Tube Face Water Absorbing Member]

The function of the inner tube face water absorbing member 33 will be described with reference to an experimental result obtained using an experimental apparatus configured as described below.

Figure 3:
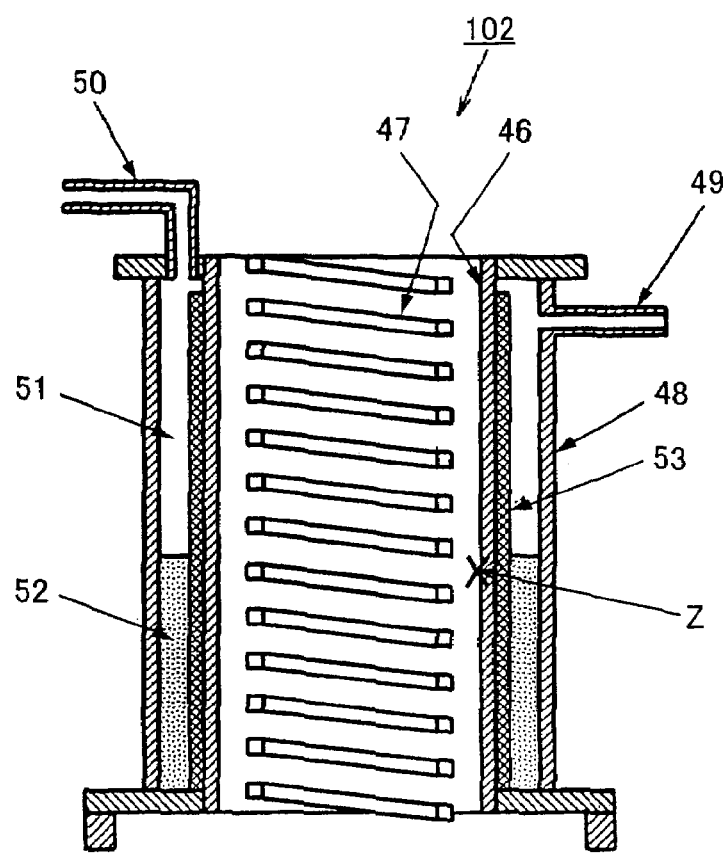
FIG. 3 is a cross-sectional view schematically showing a configuration of an experimental apparatus.

FIG. 3 is a cross-sectional view schematically showing a configuration of the experimental apparatus. As shown in FIG. 3, an experimental apparatus 102 comprises a stainless inner tube 46, and a glass outer tube 48. A coil heater 47 is provided on an inner side of the inner tube 46.

An evaporation chamber 51 is provided in a space between the inner tube 46 and the outer tube 48. On an upper portion of a side face of the evaporation chamber 51, there are provided a water supply pipe 49 configured to supply water to the experimental apparatus 102 and a steam discharge pipe 50 configured to discharge a steam generated in the evaporation chamber 51 to outside of the experimental apparatus 102.

A water absorbing member 53 is provided over the entire surface of an outer face (face on the side of the evaporation chamber 51) of the inner tube 46. Three types of materials of the water absorbing member 53 are prepared: i) porous stainless metal having a thickness of 0.5 mm and an average hole diameter of 0.2 mm, which is similar to the material of the water absorbing member provided on the hydrogen generator 100 of the present invention, ii) three sheets of woven wires having 300 meshes and a wire diameter of 48 μm, and iii) a glass woven-fabric having a thickness of 1 mm, were prepared.

An experiment was conducted in the experimental apparatus 102 configured as described above. First of all, a certain amount of water 52 was supplied to the evaporation chamber 51 through the water supply pipe 49 and reserved therein. Thereafter, while the heater 47 was heating the inner tube 46 to cause the water 52 in the evaporation chamber 51 to be boiled and evaporated, the evaporation rate of the water 52 was measured with a lapse of time. The evaporation rate of the water 52 was calculated based on weight variation of the experimental apparatus 102.

Further, an experimental apparatus which is not provided with the water absorbing member 53 on the outer face of the inner tube 46 of the experimental apparatus 102, was prepared. In this experimental apparatus, the evaporation rate of the water 52 was measured with a lapse of time.

Figure 4:
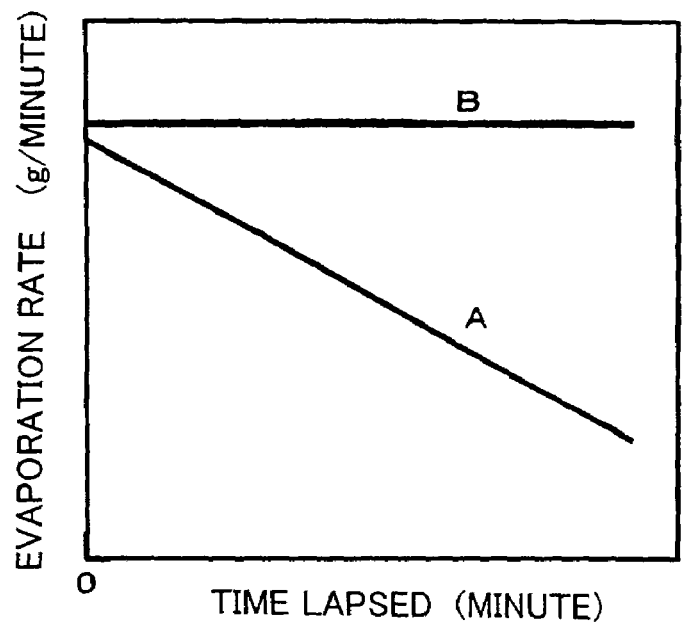
FIG. 4 is a graph showing a variation in an evaporation rate of water within the evaporation chamber which is provided with a water absorbing member and a variation in an evaporation rate of water within the evaporation chamber which is not provided with the water absorbing member.

FIG. 4 is a graph showing variation in the evaporation rate of the water 52 within the evaporation chamber 51 which is provided with the water absorbing member 53 and variation in the evaporation rate of the water 52 within the evaporation chamber 51 which is not provided with the water absorbing member 53. In FIG. 4, A represents the variation in the evaporation rate in the evaporation chamber 51 which is not provided with the water absorbing member 53 and B represents the variation in the evaporation rate in the evaporation chamber 51 which is provided with the water absorbing member 53. The graph in FIG. 4 represents the relationship between time that lapses from a time point when the heater 47 starts heating and the water 52 within the evaporation chamber 51 is reduced to a predetermined amount and an evaporation rate with the lapse of time.

As shown in FIG. 4, in the evaporation chamber 51 which is not provided with the water absorbing member 53, the evaporation rate of the water 52 decreases linearly with the lapse of time. On the other hand, in the evaporation chamber 51 which is provided with the water absorbing member 53, the evaporation rate of the water 52 is kept at a constant value with the lapse of time.

When the evaporation chamber 51 which is not provided with the water absorbing member 53 was observed through the glass outer tube 48, boiling occurred vigorously at plural positions of the outer face of the inner tube 46 that were located at a level under the water 52 and bubbles were generated. On the other hand, when the evaporation chamber 51 which is provided with the water absorbing member 53 was observed through the glass outer tube 48, numerous minute bubbles were generated from substantially over the entire surface of the water absorbing member 53 located below the level of the water 52. This is because minute concave and convex portions in a porous portion of the surface of the water absorbing member 53 function as boiling nucleuses and promotes boiling. In this boiling, the minute bubbles were generated gently in contrast to the vigorous generation of the bubbles in the evaporator 51 which is not provided with the water absorbing member 53.

In a portion above the level of the water 52 in the evaporation chamber 51 which is not provided with the water absorbing member 53, no reaction occurred on the outer face of the inner tube 46. On the other hand, it was observed that in the evaporation chamber 51 which is provided with the water absorbing member 53, the surface of the water absorbing member 53 got wet by the water suctioned up by a capillary force of the water absorbing member 53. Therefore, the portion of the water absorbing member 53 above the level of the water 52 functioned as a heat transmission area, and it was observed that water was evaporated from this portion.

Figure 5:
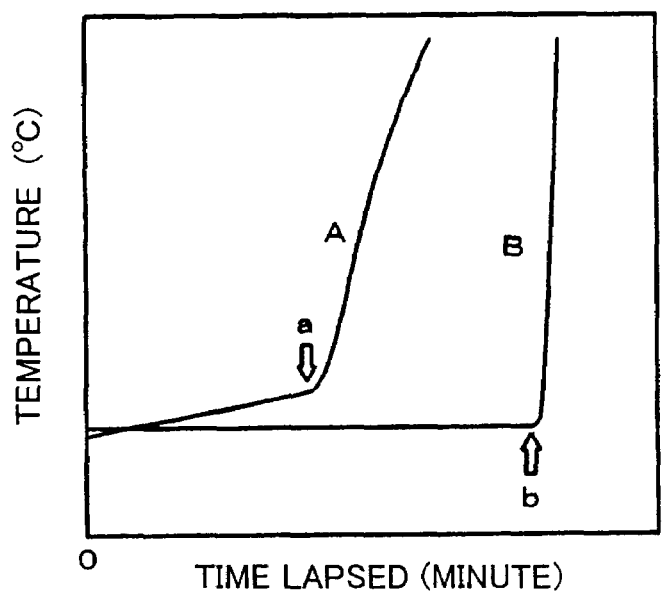
FIG. 5 is a graph showing a temperature variation at a predetermined position of an inner tube of the evaporation chamber which is provided with the water absorbing member and a temperature variation at the predetermined position of the inner tube of the evaporation chamber which is not provided with the water absorbing member.

FIG. 5 shows variation in temperature measured under the condition in which a thermo couple is fixed to a position indicated by Z in FIG. 3, i.e., a position of the inner face of the inner tube 46, which is slightly lower than the level of the water 52 remaining within the evaporation chamber 51. In FIG. 5, A represents temperature variation in the position Z in the evaporation chamber 51 which is not provided with the water absorbing member 53 and B represents temperature variation at the position Z at the evaporation chamber 51 which is provided with the water absorbing member 53.

As shown in FIG. 5, in the evaporation chamber 51 which is not provided with the water absorbing member 53, the temperature at the position Z increased gradually until the lapse time reached a point, and then increased rapidly. The rapid increase in temperature at the position Z from the point a is due to the event that the level of the water 52 became lower than the position Z when the lapse time reached the a point.

On the other hand, in the evaporation chamber 51 which is provided with the water absorbing member 53, the temperature at the position Z was kept constant until the lapse time reached b point (corresponding to lapse of a predetermined time after a point), and thereafter when the lapse time reached the b point, the temperature at the position Z increased rapidly. The reason why the temperature at the position Z was kept constant until the lapse time reached b point and the temperature at the position Z was not increased even when the level of the water 52 became lower than the position Z (apse time reached a point) was that substantially the entire surface of the outer face of the inner tube 46 functioned as an evaporation or boiling face by the capillary force of the water absorbing member 53. The reason why the temperature at the position Z increased rapidly when the lapse time reached b was due to the event that the water 52 within the evaporation chamber 51 were all evaporated.

As apparent from the above experiment result, by providing the inner tube face water absorbing member 33 on the outer face of the inner tube 10 of the evaporator 32, the reforming water 2 remaining in the lower portion of the evaporator 32 during start of the hydrogen generator 100 is caused to flow upward by the capillary force of the inner tube face water absorbing member 33, thus increasing a heat transmission area. In contrast with the hydrogen generator 100 which is not provided with the inner tube face water absorbing member 33, sufficient evaporation capability can be obtained in the evaporator 32 of a small size. Consequently, the hydrogen generator 100 can be small-sized.

In addition, the minute convex and concave portions of the surface of the inner tube face water absorbing member 33 function as boiling nucleuses, the evaporation rate can be increased. Therefore, even when the reforming water 2 remains within the evaporator 32 during start of the hydrogen generator 100, the steam can be generated quickly. This reduces the start time of the hydrogen generator 100.

As a matter of course, the increased evaporation rate is effective during steady operation and load fluctuation of the hydrogen generator 100, as well as during start. In the hydrogen generator 100 which is provided with the inner tube face water absorbing member 33, boiling and evaporation occur from substantially the entire surface thereof, thereby allowing the steam to be generated stably and gently. On the other hand, in the hydrogen generator 100 which is not provided with the inner tube face water absorbing member 33, the number of boiling nucleuses is limited, so that partial boiling occurs or boiling vigorously occurs from limited boiling nucleuses. These phenomena arise unstable amount of evaporation and large pressure variation due to boiling, and causes a temporal excess and deficiency of the steam supplied to the reforming catalyst layer 18 and pressure variation in the hydrogen generator 100. The excess and deficiency of the steam causes variation in composition of the substances generated by a steam reforming reaction and the pressure difference in the hydrogen generator 100 causes variation in the amount of hydrogen generated in the hydrogen generator 100. The inner tube face water absorbing member 33 serves to avoid occurrence of these events.

As should be appreciated from the foregoing, the evaporation rate of water can be increased by providing the inner tube face water absorbing member 33 on an evaporation face of the inner tube 10. In addition, advantageously, the evaporation rate can be kept to be high regardless of the amount of water remaining within the evaporator 32. Further, the composition and amount of the substances generated in the hydrogen generator 100 can be stabilized.

Similar result was obtained when the experiment was conducted using any of the above-described three types of materials. Therefore, as the material of the inner tube face water absorbing member 33, any of these materials may be used.

The suction of the reforming water 2 by the capillary force of the inner tube face water absorbing member 33 is important for the purpose of increasing a heat transmission area and an evaporation area. The height of the water suctioned up by the capillary force varies depending on the width of the second evaporation chamber 15, i.e., the width of the flow passage through which the water flows. When the water amount is equal, the height becomes higher as the width of the flow passage decreases. Apart from the height of the suctioned water, the water is evaporated before the water being suctioned up reaches sufficient height unless the amount and speed of the suctioned water is greater relative to the amount of the evaporated water. Under this condition, the heat transmission area and the evaporation area cannot be increased. In view of this, in the case of the inner tube face water absorbing member 33 made of the porous metal, the average hole diameter is preferably about not less than 0.1 mm and not more than 0.5 mm. In the case of the inner tube face water absorbing member 33 made of the woven wire, the meshes are preferably about not less than 100 and not more than 500. In order to enable the surface of the inner tube face water absorbing member 33 to get wet, the surface is preferably oxidized.

While the experiment was conducted using the experimental apparatus 102, it was apparent that the speed at which the water was suctioned up became higher by fixing the water absorbing member 53 to the inner tube 46 by means of wound wires, as compared to the inner tube 46 provided with only the water absorbing member 53. This was due to the fact that the water quickly moved upwardly through the gap formed between the water absorbing member 53 and the inner tube 46. The water quickly moves upwardly within holes of the porous metal or woven wire. The flow of the water is impeded by aggregate of porous metal or a wire of woven wires present within the small holes. This causes the water flow passage to turn in a complex manner. In contrast, since there are no substances in the gap between the water absorbing member 53 and the inner tube 46, the speed at which the water is suctioned up becomes higher. Here, in order to improve the speed at which the water is suctioned up, the gap between the water absorbing member 53 and the inner tube 46 should be a space with an average hole diameter of the water absorbing member 53 or more.

Figure 6:
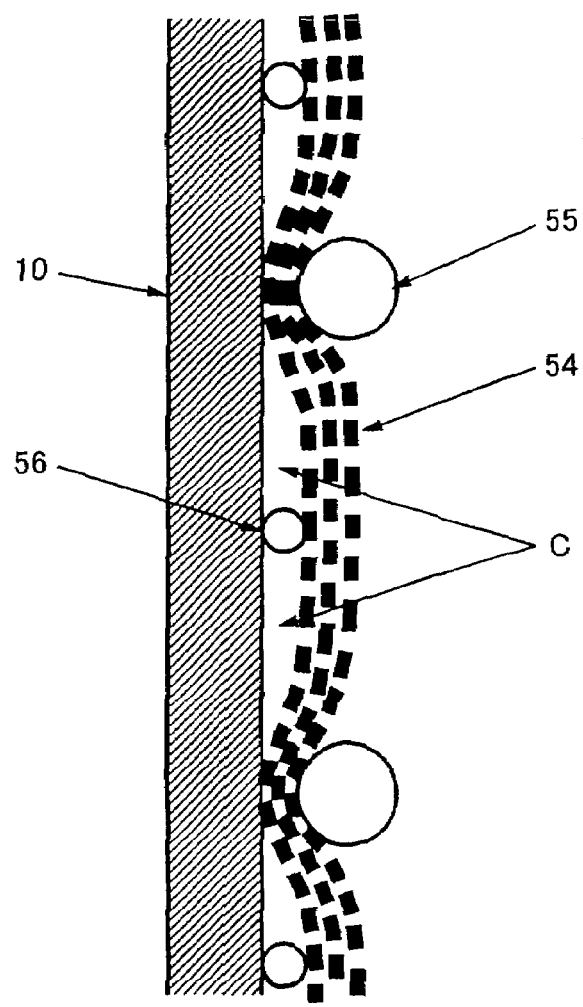
FIG. 6 is a cross-sectional view showing an example of a configuration of an inner tube face water absorbing member.

In the hydrogen generator 100 of the present invention, as shown in FIG. 6, it is preferable that a plurality of gaps C are formed as spaces having an average hole diameter of the woven wire 54 or more in such a manner that a plurality of spacers 56 are provided at proper positions between the woven wire 54 as the inner tube face water absorbing member and the inner tube 10, and the woven wire 54 is fixed to the outer face of the inner tube 10 by winding the wire. By providing the plurality of spaces C between the woven wire 54 and the inner tube 10, the speed at which the water is suctioned up can be improved.

Figure 7:
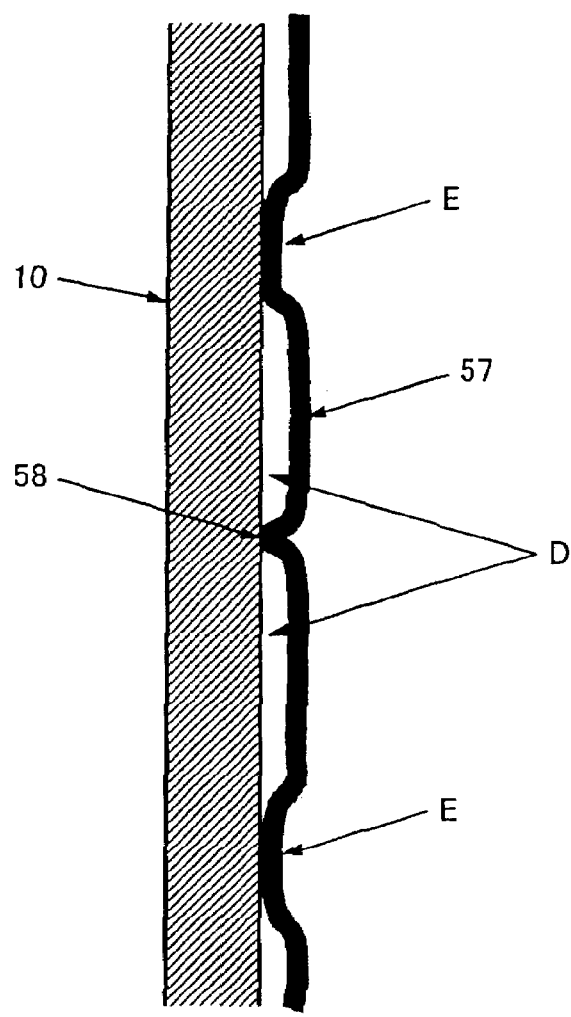
FIG. 7 is a cross-sectional view showing an example of the configuration of the inner tube face water absorbing member.

As shown in FIG. 7, in order to fix the porous metal 57 as the inner tube face water absorbing member to the outer face of the inner tube 10 by spot welding, it is preferable that protrusions 58 are provided at proper positions of the porous metal 57 so as to be in contact with the outer face of the inner tube 10, thereby forming a plurality of gaps D corresponding to spaces having an average hole diameter of the porous metal 57 or more. By thus forming the plurality of gaps D between the porous metal 57 and the inner tube 10, the speed at which the water is suctioned up can be improved. In FIG. 7, the porous metal 57 is spot-welded to the outer face of the inner tube 10 at locations represented by E.

Figure 8:
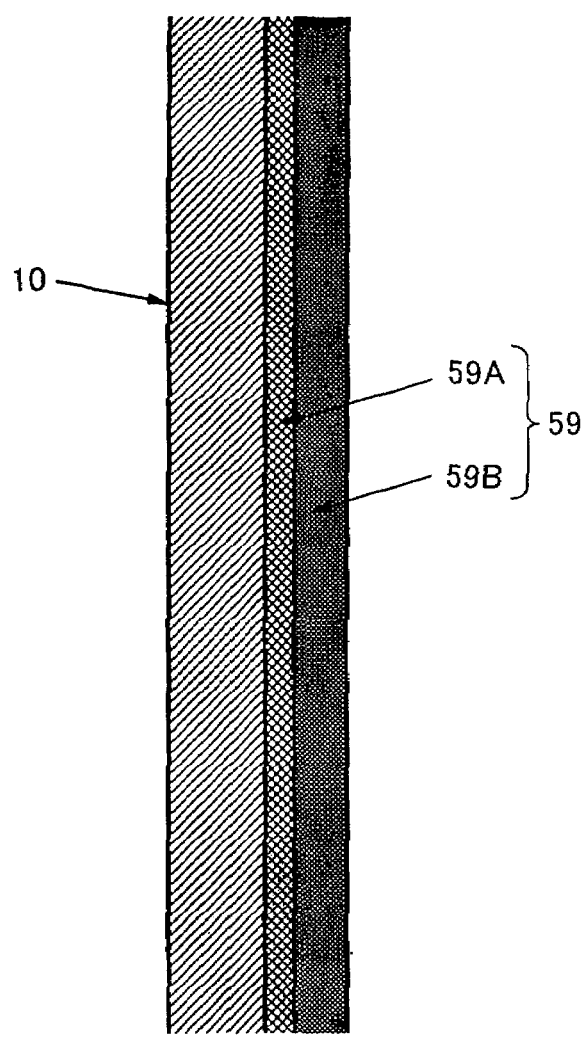
FIG. 8 is a cross-sectional view showing an example of the configuration of the inner tube face water absorbing member.

In the same manner, as shown in FIG. 8, the porous metal 59 as the inner tube face water absorbing member has a two-layered structure comprised of porous metal 59A having a relatively large hole diameter and porous metal 59B having a relatively small hole diameter. In this structure, the porous metal 59 is configured such that the porous metal 59A is located on an inner side of the porous metal 59B and the porous metal 59A is in contact with the outer face of the inner tube 10. The flow of the water is impeded less in the porous metal A than in the porous metal 59B. The porous metal 59 having such a two-layered structure can improve the speed at which the water is suctioned up.

Figures 9A, 9B:
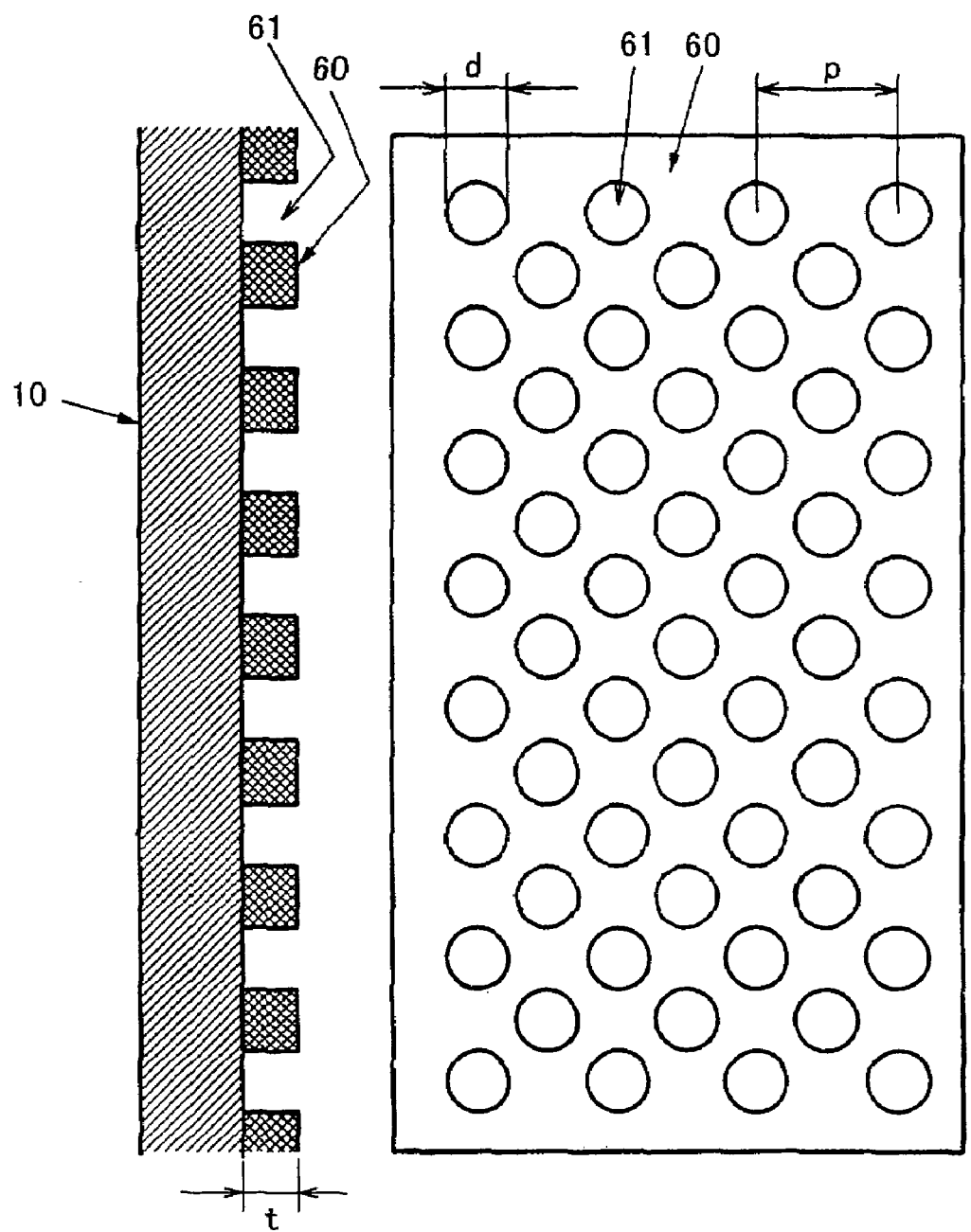
FIG. 9A is a cross-sectional view of a thin plate attached to an outer face of an inner tube of the evaporator included in the hydrogen generator of the present invention, showing a configuration of the inner tube and the thin plate.
FIG. 9B is a plan view of the thin plate in FIG. 9A.

In addition to the structures of the inner tube face water absorbing member described above, a structure shown in FIG. 9 is effective. FIG. 9A is a cross-sectional view of a thin plate attached to the outer face of the inner tube of the evaporator included in the hydrogen generator of the present invention, showing a configuration of the inner tube and the thin plate, and FIG. 9B is a plan view of the thin plate.

As shown in FIGS. 9A and 9B, a thin plate 60 is provided with a plurality of holes 61 of a diameter d which are formed at a pitch p of the holes by etching. In this structure, the diameter d of the holes 61 is set to 0.1 mm, the pitch p of the holes 61 is set to 0.3 mm, and the thickness t of the thin plate 60 is set to 0.1 mm.

The thin plate 60 structured as described above is joined to the outer face of the inner tube 10 so as to disperse the holes 61, thereby forming a concave/convex structure on the outer face of the inner tube 10 as shown in FIG. 9A. The concave/convex structure functions as an inner tube face water absorbing member, and serves as boiling water to promote boiling. The shape of the hole 61 is not intended to be limited to a circle, but may be other suitable shapes including ellipse, lozenge, etc.

The concave/convex structure may be formed by directly providing a plurality of concave portions on the outer face of the inner tube 10 by etching process. In an alternative example, minute concave/convex portions may be formed on the outer face of the inner tube 10 by blasting process. In a further alternative example, grooves may be formed on the outer face of the inner tube 10 in a grid form at a pitch of about 0.1 mm by laser processing. When the concave/convex structure is formed on the outer face of the inner tube 10 by laser processing, it is preferable that the outer face of the inner tube 10 after processed is significantly rough because of the presence of metal particles re-adhering to and deposited thereon during laser processing, because such an outer face has satisfactory water suction capability and boiling capability. It should be further noted that if such roughness on the processed surface is removed by acid-washing, these capabilities are greatly degraded. It should be further noted that if the spacing between the holes or grooves, i.e., spacing between the concave and convex portions is too large, then the capabilities are degraded, whereas if they are too small, the amount of suctioned water is reduced. In view of this, the proper value of the spacing is approximately not less than 0.05 mm and not more than 1 mm.

In order for the inner tube face water absorbing member 33 to suction up all the reforming water 2 remaining in the evaporator 32, the inner tube face water absorbing member 33 is placed such that its lower end is contact with the bottom plate 12. In view of assembly precision of the evaporator 32, it is difficult to assemble the inner tube face water absorbing member 33 such that the lower end thereof is fully in contact with the bottom plate 12, but, it is desirable to assemble the member 33 such that the lower end is spaced approximately several mm or less apart from the bottom plate 12. It is desirable that an upper end of the inner tube face water absorbing member 33 extend to a substantially upper end of the intermediate tube 11. Nonetheless, the upper end of the inner tube face water absorbing member 33 may extend to a predetermined height which is sufficient to ensure an area required to transmit heat and evaporate water.

A required amount of the reforming water 2 is evaporated before the reforming water is suctioned up to the upper end portion of the inner tube face water absorbing member 33, and the inner tube face water absorbing member 33 might be thereby dried. Accordingly, the heat conductivity of the material of the inner tube face water absorbing member 33 is approximately equal to or higher than that of the material forming the inner tube 10. This is because, when the heat conductivity of the material of the inner tube face water absorbing member 33 is lower than that of the inner tube 10, the inner tube face water absorbing member 33 becomes heat resistance in heat transmission. The inner tube 10 is generally made of stainless steel, and therefore, the inner tube face water absorbing member 33 is preferably made of metal. The evaporation rate of a glass woven fabric has been described above, but the glass fabric is undesirable for use as the inner tube face water absorbing member 33, because its heat conductivity is low.

[Bottom Plate Face Water Absorbing Member]

Subsequently, a function of the bottom plate face water absorbing member 35 included in the hydrogen generator 100 of the present invention, will be described.

As a material of the bottom plate face water absorbing member 35, a material of the inner tube face water absorbing member 33 is used. Thereby, the bottom plate face water absorbing member 35 has a number of boiling nucleuses for promoting boiling of the reforming water 2. The provision of the bottom plate face water absorbing member 35 promotes boiling of the reforming water 2 and achieves reduction of start time of the hydrogen generator 100 and stable and gentle generation of the steam.

Under the condition in which the bottom plate face water absorbing member 35 is substantially in contact with the inner tube face water absorbing member 33, for example, even when the hydrogen generator 100 is installed in an inclined condition, the water reserved in the lower portion of the evaporator 32 is reliably supplied to the inner tube face water absorbing member 33 through the bottom plate face water absorbing member 35.

[Outer Tube Face Water Absorbing Member]

Subsequently, a function of the outer tube face water absorbing member 34 included in the hydrogen generator of the present invention will be described.

Figure 12:
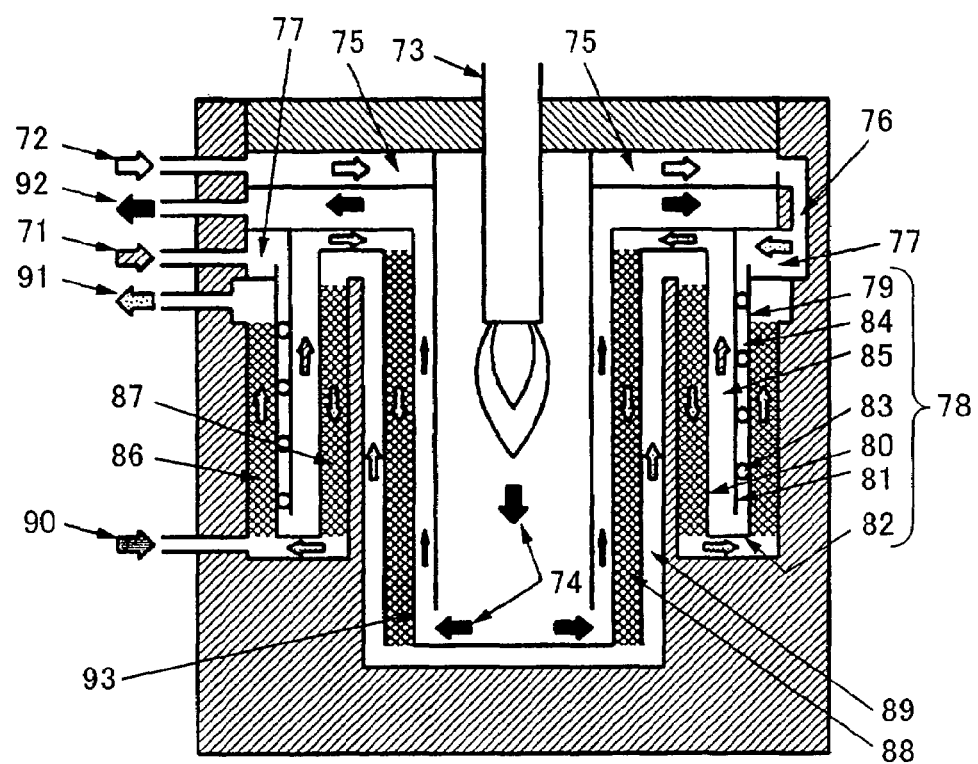
FIG. 12 is a cross-sectional view schematically showing a configuration of the conventional hydrogen generator.
Figure 13:
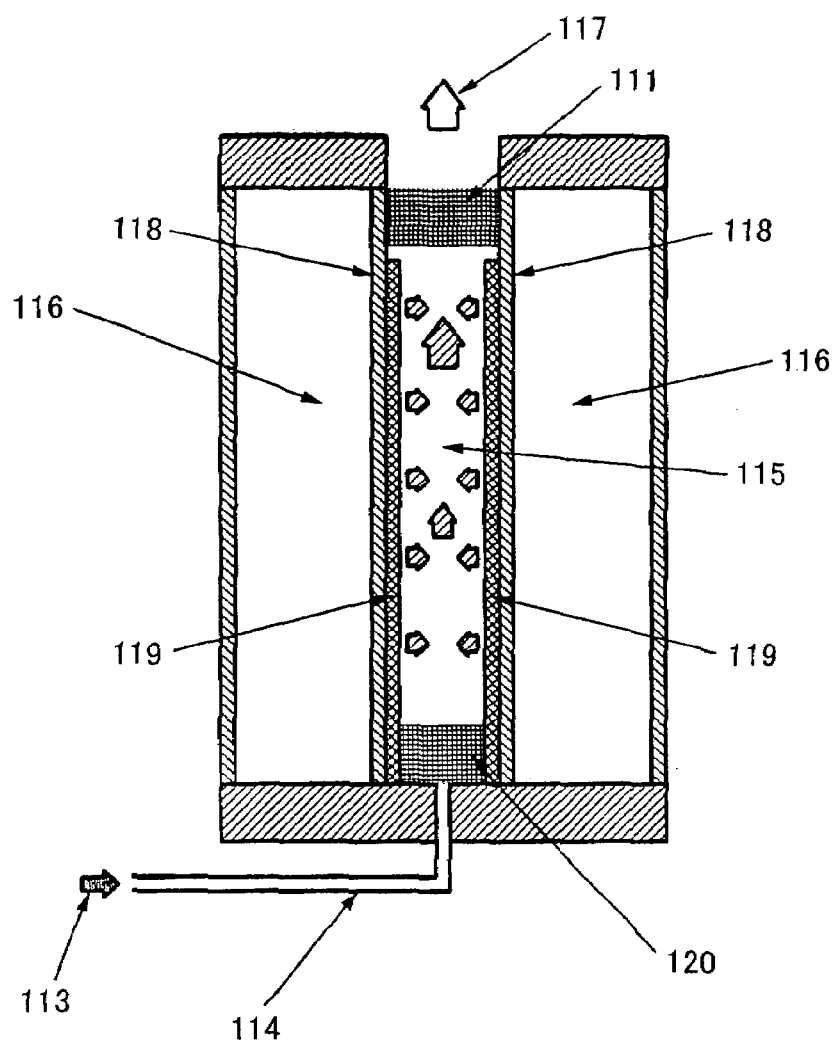
FIG. 13 is a cross-sectional view schematically showing a configuration of the evaporator included in the conventional hydrogen generator.

When the reforming water 2 being delivered to the supply passage 7 through the connecting tube 6 drops into the first evaporation chamber 14, it does not flow uniformly to the inner face of the outer tube 9 (face on the side of the first evaporation chamber 14). As described above, since the flow rate of the reforming water 2 is generally as little as about 10 g/min, one or a plurality of streams of the reforming water 2 flows to the inner face of the outer tube 9. In the conventional hydrogen generator described with reference to FIG. 12, the spiral round bars 83 are provided so that the reforming water 72 moistens large part of the inner face of the outer tube 79 and an increased heat transmission area that contributes boiling and evaporation is gained. Instead of the spiral round bars 83 provided in the conventional hydrogen generator, the outer tube face water absorbing member 34 made of tape-shaped porous metal is fixed to the inner face of the outer tube 9 by spot welding. Here, the outer tube face water absorbing member 34 and the inner tube face water absorbing member 33 are made of the same porous metal.

The porous metal used in the present invention has a hole diameter as small as 0.2 mm, and when the porous metal makes contact with the water, the water is caused to quickly flow through the holes of the porous metal by the capillary force of the porous metal, as described above. This will be described with reference to FIG. 10.

Figure 10:
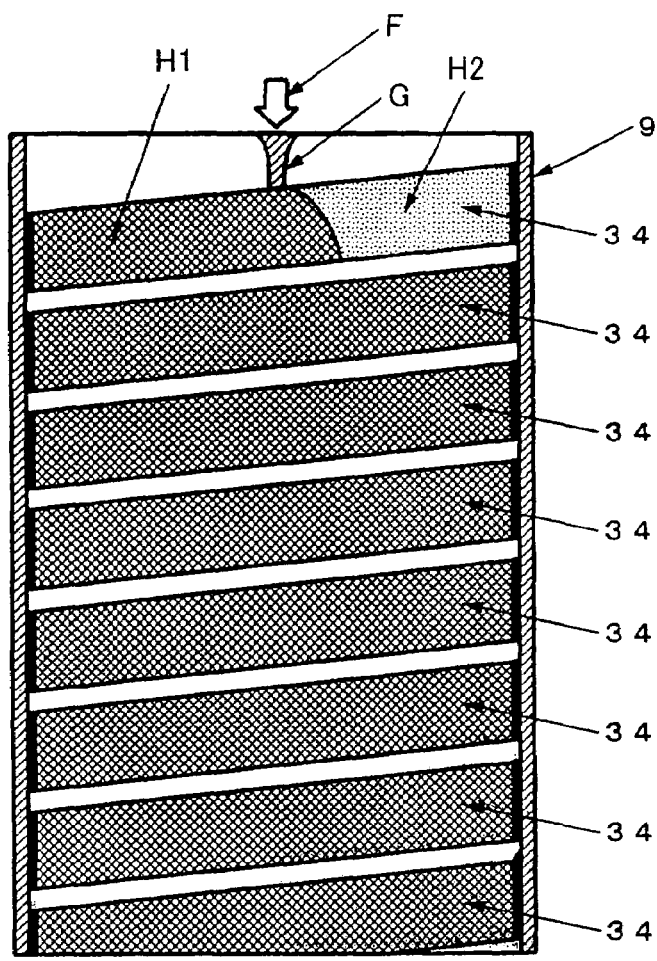
FIG. 10 is a cross-sectional view showing a configuration of an outer tube of the evaporator included in the hydrogen generator of the present invention.
Figure 11:
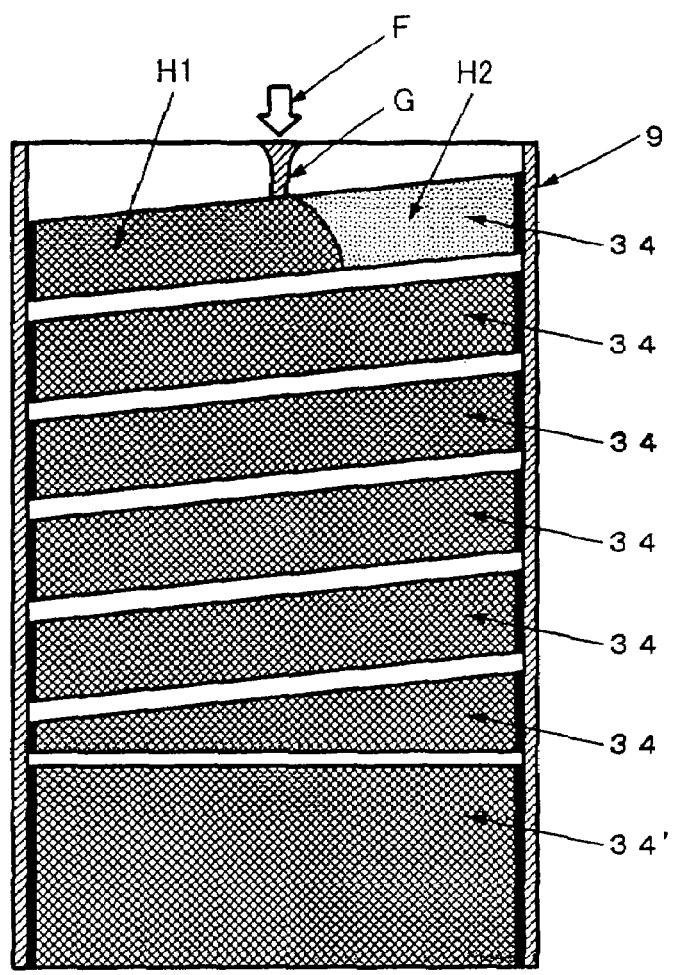
FIG. 11 is a cross-sectional view showing a configuration of the outer tube of the evaporator included in the hydrogen generator of the present invention.

FIG. 10 is a cross-sectional view showing a configuration of the outer tube 9. As shown in FIG. 10, the tape-shaped water absorbing member 34 is spirally wound and fixed to the inner face of the outer tube 9. In FIG. 10, F denotes a position from which the reforming water 72 flows downwardly. The reforming water 72 flows downwardly in a stream shape as represented by G from this position F.

Upon contact with the outer tube face water absorbing member 34, the reforming water flows through the holes of the outer tube face water absorbing member 34, and hence flows within the outer tube face water absorbing member 34 arranged in the shape of spiral. In this configuration, most of the area of the inner face of the outer tube 9 is in contact with the reforming water 2, and therefore, the heat transmission area can be significantly increased in the hydrogen generator of this embodiment as compared to the conventional hydrogen generator. In addition, the increased heat transmission area due to the porous metal promotes quick evaporation of the reforming water and promotes further evaporation because of the increased boiling nucleus as in the inner tube face water absorbing member 33 and the outer tube face water absorbing member 34. Therefore, while flowing downwardly within the holes of the spiral outer tube face water absorbing member 34, the reforming water 2 is quickly heated and evaporated. This evaporation is stable and gentle as in the evaporation of the inner tube face water absorbing member 33. This stabilizes composition of the substances generated by the steam reforming reaction and the amount of hydrogen generated by the steam reforming reaction.

In FIG. 10, H1 denotes a region through which the reforming water flows downwardly, and H2 denotes a region which the reforming water does not reach because the region H2 is located above the position at which the reforming water makes contact with the water absorbing member 34. The region H2 effectively functions as a heat transmission face because the reforming water 2 is suctioned up by the capillary force.

Thus, since the outer tube face water absorbing member 34 is fixed to the inner face of the outer tube 9 in the spiral shape, the round bars 83 that are necessary in the conventional hydrogen generator becomes unnecessary. The configuration and manufacturing of the evaporator 32 included in the hydrogen generator 100 can be greatly simplified. As a result, the manufacturing cost of the hydrogen generator 100 can be reduced.

The hole diameter and thickness of the outer tube face water absorbing member 34, and the width of the spiral shape of the water absorbing member 34 and the gap between vertically adjacent spiral portions of the water absorbing member 34, may be suitably optimized as necessary. The spiral shape may be varied between an upper portion and a lower portion of the outer tube 9. The spiral water absorbing member 34 need not extend to a lowermost portion of the outer tube 9. For example, the outer tube face water absorbing member 34 may extend to a vertical position of the outer tube 9 from above and then may be cylindrical as represented by 34'. The outer face water absorbing member 34 is made of porous metal, but may be made of a material applicable to the inner tube face water absorbing member 33. Further, the inner face of the outer tube 9 may be subjected to non-leveling process.

The shape of the outer tube face water absorbing member 34 need not be spiral. The provision of the outer tube face water absorbing member 34 having a shape other than the spiral can increase the heat transmission area. So, the hydrogen generator 100 can have higher evaporation capability, because of the increased heat transmission area.

In the evaporator 32 of the hydrogen generator 100 of the present invention, the intermediate tube 11 may be omitted. The intermediate tube 11 can extend time during which the steam is mixed with and in contact with the city gas 1 to accomplish sufficient mixing. If the steam is insufficiently mixed with the city gas 1, then the ratio between the steam and the city gas 1 supplied to the reforming catalyst layer 8 becomes non-uniform. This results in a fluctuation in the composition of the generated gas. The intermediate tube 11 of the evaporator 32 can inhibit the fluctuation in the composition of the generated gas.

The water absorbing members are not necessarily provided on all of the outer face of the inner tube 10, the inner face of the outer tube 9, and the surface of the bottom plate 12. The same effects are also obtained by providing the water absorbing members on one or two of these faces.

In the hydrogen generator 100, the reforming water 2 is supplied to the first evaporation chamber 14 from above of the outer tube 9. This is because the second evaporation chamber 15 is heated up to the temperature between 250° C. and 350° C. from the side of the inner tube 10 and the first evaporation chamber 14 is heated up to the temperature between 100° C. and 150° C. from the side of the outer tube 9. When the reforming water 2 is supplied from the inner tube 10 side to the second evaporation chamber 15, the reforming water 2 directly makes contact with a high-temperature face with the temperature between 250° C. and 350° C. Upon contact with such a high-temperature face, the water is abruptly boiled, and therefore does not flow within the water absorbing member. It is therefore necessary to supply the reforming water 2 from the face of the outer tube 9 on the low-temperature side to the first evaporation chamber 14.

The water to be evaporated is not intended to be limited to the reforming water. The hydrogen generator of the present invention functions well even when a liquid fuel such as methanol is used as the liquid to be evaporated.

In the hydrogen generator 100 of the present invention, since the evaporator 32 is arranged integrally with the hydrogen generator 100, loss of heat emission of the steam generated in the evaporator 32 and fluid as a heat source can be inhibited. Therefore, the hydrogen generator 100 of the present invention has heat efficiency higher than that of the conventional hydrogen generator.

Numerous modifications and alternative embodiments of the invention will be apparent to those skilled in the art in the light of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

What is claimed is:

1. A hydrogen generator comprising:
a burner for generating a combustion gas;
a reformer provided around the burner to generate a reformed gas containing hydrogen by a steam reforming reaction from a feed material comprising a compound containing at least carbon and hydrogen and a steam, using heat transmission from a combustion gas generated by the burner; and
an evaporator having an inner tube provided around the burner, an outer tube provided around the inner tube, and a bottom plate that closes a lower portion of a tubular space formed between the inner tube and the outer tube, the evaporator being configured to evaporate water supplied to the tubular space to generate the steam to be supplied to the reformer, wherein
a water absorbing member having a water absorbing capability is provided in the tubular space.

2. The hydrogen generator according to claim 1, wherein a first evaporation chamber having a downward flow passage through which the water supplied from above flows downwardly, and a second evaporation chamber provided on an inner side of the first evaporation chamber and having an upward flow passage through which the steam generated by evaporation of the water within the first evaporation chamber flows upwardly are provided in the tubular space, and
the water absorbing member is provided within the first evaporation chamber.

3. The hydrogen generator according to claim 2, wherein the evaporator further has an intermediate tube disposed between the inner tube and the outer tube, the first evaporation chamber is provided in a tubular space formed between the outer tube and the intermediate tube, and the second evaporation chamber is provided in a tubular space formed between the inner tube and the intermediate tube, and
the water absorbing member is provided on a face of the outer tube on the first evaporation chamber side.

4. The hydrogen generator according to claim 1, wherein a first evaporation chamber having a downward flow passage through which the water supplied from above flows downwardly, and a second evaporation chamber provided on an inner side of the first evaporation chamber and having an upward flow passage through which the steam generated by evaporation of the water within the first evaporation chamber flows upwardly are provided in the tubular space, and
the water absorbing member is provided within the second evaporation chamber.

5. The hydrogen generator according to claim 4, wherein the evaporator further has an intermediate tube disposed between the inner tube and the outer tube, the first evaporation chamber is provided in a tubular space formed between the outer tube and the intermediate tube, and the second evaporation chamber is provided in a tubular space formed between the inner tube and the intermediate tube, and
the water absorbing member is provided on a face of the inner tube on the second evaporation chamber side.

6. The hydrogen generator according to claim 1, wherein a first evaporation chamber having a downward flow passage through which the water supplied from above flows downwardly, and a second evaporation chamber provided on an inner side of the first evaporation chamber and having an upward flow passage through which the steam generated by evaporation of the water within the first evaporation chamber flows upwardly are provided in the tubular space, and
the water absorbing member is provided within the first evaporation chamber and the second evaporation chamber.

7. The hydrogen generator according to claim 6, wherein the evaporator has an intermediate tube disposed between the inner tube and the outer tube, the first evaporation chamber is provided in a tubular space formed between the outer tube and the intermediate tube, and the second evaporation chamber is provided in a tubular space formed between the inner tube and the intermediate tube, and
the water absorbing member is provided on a face of the outer tube on the first evaporation chamber side and a face of the inner tube on the second evaporation chamber side.

8. The hydrogen generator according to claim 1, wherein the water absorbing member is provided on an upper face of the bottom plate.

9. The hydrogen generator according to claim 1, wherein the water absorbing member is made of one of a porous material, a mesh-shaped material, and a fabric-shaped material.

10. The hydrogen generator according to claim 2, wherein the water absorbing member provided on a face of the outer tube on the first evaporation chamber side is arranged in a spiral shape.

11. The hydrogen generator according to claim 4, wherein the water absorbing member provided on a face of the inner tube on the second evaporation chamber side is made of a material having a plurality of holes, and a space having an average hole diameter of the water absorbing member or more is provided between the face of the inner tube on the second evaporation chamber side and the water absorbing member.

12. The hydrogen generator according to claim 4, wherein heat conductivity of the water absorbing member provided on a face of the inner tube on the second evaporation chamber side is equal to or higher than heat conductivity of the inner tube.

13. The hydrogen generator according to claim 3, wherein the water absorbing member is formed by performing non-leveling process on the face of the outer tube on the first evaporation chamber side.

14. The hydrogen generator according to claim 5, wherein the water absorbing member is formed by performing non-leveling process on the face of the inner tube on the second evaporation chamber side.

15. The hydrogen generator according to claim 7, wherein the water absorbing member is formed by performing non-leveling process on the face of the outer tube on the first evaporation chamber side and on the face of the inner tube on the second evaporation chamber side.

16. The hydrogen generator according to claim 13 or 14, wherein a spacing between concave and convex portions formed by the non-leveling process is not less than 0.05 mm and not more than 1 mm.

17. The hydrogen generator according to claim 13 or 14, wherein the non-leveling process is performed by one of etching process, laser processing, and blasting process.

18. A fuel cell system comprising:
a hydrogen generator including:
a burner for generating a combustion gas;
a reformer provided around the burner to generate a reformed gas containing hydrogen by a steam reforming reaction based on a feed material comprising a compound containing at least carbon and hydrogen and a steam, using heat transmission from a combustion gas generated by the burner; and
an evaporator having an inner tube provided around the burner, an outer tube provided around the inner tube, and a bottom plate that closes a lower portion of a tubular space formed between the inner tube and the outer tube, the evaporator being configured to evaporate water supplied to the tubular space to generate the steam to be supplied to the reformer, wherein
a water absorbing member having a water absorbing capability is provided in the tubular space; and
a fuel cell configured to generate a power using an oxidization gas containing oxygen and the reformed gas supplied from the hydrogen generator.

* * * * *